United States Patent
Wu

(10) Patent No.: US 6,210,294 B1
(45) Date of Patent: Apr. 3, 2001

(54) POLYURETHANE GOLF BALL WITH IMPROVED RESILIENCY

(75) Inventor: Shenshen Wu, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/311,591

(22) Filed: May 14, 1999

(51) Int. Cl.$^7$ .............................. A63B 37/04; A63B 37/06
(52) U.S. Cl. ..................... 473/377; 473/372; 473/378; 473/385; 524/839; 524/847; 525/129; 525/207; 525/208; 528/66; 528/79
(58) Field of Search ..................... 473/372, 377, 473/378, 385; 525/129, 207, 208; 524/839, 847; 528/66, 79

(56) References Cited

U.S. PATENT DOCUMENTS

| | | | | |
|---|---|---|---|---|
| 3,808,077 | * | 4/1974 | Rieser | 156/102 |
| 4,062,825 | * | 12/1977 | Watabe | 260/37 N |
| 4,499,239 | | 2/1985 | Murakami et al. | 525/111 |
| 4,858,924 | | 8/1989 | Saito et al. | 273/62 |
| 4,914,152 | | 4/1990 | Miyashita et al. | 525/68 |
| 4,968,752 | | 11/1990 | Kawamoto et al. | 525/194 |
| 5,006,297 | | 4/1991 | Brown et al. | 264/234 |
| 5,334,673 | | 8/1994 | Wu | 273/235 |
| 5,461,109 | * | 10/1995 | Blair | 524/839 |
| 5,484,870 | | 1/1996 | Wu | 528/28 |
| 5,496,496 | * | 3/1996 | Kajita | 252/182.24 |
| 5,543,467 | | 8/1996 | Hamada et al. | 525/207 |
| 5,565,524 | | 10/1996 | Hamada et al. | 525/208 |
| 5,575,472 | | 11/1996 | Magerman et al. | 29/530 |
| 5,625,003 | | 4/1997 | Kato et al. | 525/208 |
| 5,692,974 | | 12/1997 | Wu et al. | 473/377 |
| 5,733,428 | | 3/1998 | Calabria et al. | 264/134 |
| 5,744,549 | * | 4/1998 | Lutz | 525/129 |
| 5,827,134 | * | 10/1998 | Sullivan | 473/372 |
| 5,856,388 | * | 1/1999 | Harris | 524/320 |
| 5,859,153 | * | 1/1999 | Kirk | 525/481 |
| 5,885,173 | * | 3/1999 | Keller | 473/385 |
| 5,888,437 | | 3/1999 | Calabria et al. | 264/135 |
| 5,902,855 | | 5/1999 | Sullivan | 525/221 |
| 5,908,358 | | 6/1999 | Wu | 473/378 |
| 5,959,059 | | 9/2000 | Vedula et al. | 528/76 |
| 6,117,024 | | 9/2000 | Dewanjee | 473/351 |

FOREIGN PATENT DOCUMENTS

WO 98/37929   9/1998 (WO) .

OTHER PUBLICATIONS

Raj B. Durairaj et al., "Cast Polyurethanes From Resorcinol–Based Aromatic Diols" (Oct. 10–14, 1998).

Raj B. Durairaj, "HER Materials For Polyurethane Applications" (Spring, 1999).

\* cited by examiner

Primary Examiner—Stephen F. Gerrity
Assistant Examiner—Paul D. Kim

(57) ABSTRACT

A golf ball comprising a center, a cover, and optionally, at least one intermediate layer disposed between the center and the cover, wherein at least one of the center, the cover, and the at least one intermediate layer is formed with a polyurethane composition comprising a reaction product of a prepolymer of at least one polyol and at least one polyisocyanate, and a curing agent of at least one diol. A polyurethane composition, suitable for forming golf equipment, said composition comprising a reaction product of a prepolymer of at least one polyol and at least one polyisocyanate, and a curing agent of at least one diol.

20 Claims, No Drawings

POLYURETHANE GOLF BALL WITH IMPROVED RESILIENCY

FIELD OF THE INVENTION

The invention relates generally to golf balls and, more specifically, to golf balls having components such as cores, intermediate layers, and covers formed of a polymer blend comprising a polyurethane composition. The polyurethane composition comprises a prepolymer of a polyisocyanate and a polyol, as well as a diol curing agent. The golf balls of the present invention have been found to provide desired playing characteristics such as durability and improved resilience.

BACKGROUND OF THE INVENTION

Conventional golf balls can be divided into two general types or groups: solid balls and wound balls. The difference in play characteristics resulting from these different types of constructions can be quite significant. Balls having a solid construction are generally most popular with the average recreational golfer because they provide a very durable ball while also providing maximum distance. One-piece solid golf balls are well-known in the art. Other types of solid balls, also well-known in the art, are made with a solid core, usually formed of a crosslinked rubber, which is encased by a cover material. Typically, solid cores are formed of polybutadiene which is chemically crosslinked with zinc diacrylate and/or similar crosslinking agents. The solid cores are covered by a tough, cut-proof cover, generally formed of a material such as SURLYN®, an ionomer resin produced by E.I. DuPont de Nemours and Co. of Wilmington, Del.

Ionomer resins have, to a large extent, replaced balata as a cover material. Chemically, ionomer resins are a copolymer of an olefin and an $\alpha,\beta$-ethylenically-unsaturated carboxylic acid having 10–90% of the carboxylic acid groups neutralized by a metal ion. Commercially available ionomer resins include, for example, copolymers of ethylene and methacrylic or acrylic acid neutralized with metal salts, such as SURLYN®, and IOTEK® from Exxon Corporation. These ionomer resins are distinguished by the type of metal ion, the amount of acid, and the degree of neutralization.

Surrounding the core with an ionomeric cover material provides a ball that is virtually indestructible by golfers. Further, such a combination imparts a high initial velocity to the ball which results in improved distance. Because the materials of which the ball is formed are very rigid, solid balls generally have a hard "feel" when struck with a club. Likewise, due to their hardness, these balls have a relatively low spin rate which is another factor in providing greater distance.

It is well known in the art to modify the properties of a conventional solid ball by altering the typical single layer core and single cover layer construction to provide a multi-layer ball having such as a dual cover layer, dual core layer and/or a ball having a mantle layer disposed between the cover and the core. Like the solid cores, various cover layers, mantle layers, and intermediate layers are typically formed of polybutadiene which is chemically crosslinked with zinc diacrylate and/or similar crosslinking agents. The playing characteristics of multi-layer balls, such as "feel" and compression, can be tailored by varying the properties of one or more of these intermediate layers.

The wound ball, though, remains the preferred ball of more advanced players due to its spin and feel characteristics. Wound balls typically have either a solid rubber or liquid center core around which tensioned elastic thread or yarn are wound. This wound core is then covered with a durable cover material, such as SURLYN®, or a softer cover material, such as balata or polyurethane. Balata is a natural or synthetic trans-polyisoprene rubber that is the favored cover material for highly-skilled golfers because of its softness. Wound balls are generally softer and provide more spin than non-wound balls, a characteristic that enables a skilled golfer to have more precise control over golf ball direction, flight profile, and distance. The enhanced control and stopping ability of a balata-covered, wound ball is particularly evident on approach shots into the green, where the high spin rate of these balls enables the golfer to stop the ball very near its landing position. Balata-covered balls, however, are easily damaged, and therefore lack the durability required by the recreational golfer.

A number of patents have been issued that are directed towards modifying the properties of layers used in forming conventional solid balls, multi-layer balls having dual cover layers, dual core layers and/or balls having a mantle layer disposed between the cover and the core, and wound balls. For example, polyurethanes have been recognized as useful materials for golf ball covers since as early as about 1960. U.S. Pat. No. 3,147,324 is directed to a method of making a golf ball having a polyurethane cover.

Polyurethane is the product of a reaction between a polyurethane prepolymer and a curing agent. The polyurethane prepolymer is a product formed by a reaction between a polyol and a diisocyanate. The curing agents used previously are typically diamines or glycols. A catalyst is often employed to promote the reaction between the curing agent and the polyurethane prepolymer.

Polyurethanes are typically divided into two categories: thermosets and thermoplastics. Thermoplastic polyurethanes are formed by the reaction of a diisocyanate, such as 4,4'-diphenylmethane diisocyanate ("MDI") or 3,3'-dimethyl-4,4'-biphenylene diisocyanate ("TODI"), and a polyol cured with a diol, such as 1,4-butanediol. Thermoset polyurethanes are formed by the reaction of a diisocyanate, such as 2,4-toluene diisocyanate ("TDI") or methylene-bis-(4-cyclohexyl isocyanate) ("HMDI"), and a polyol which is cured with a polyamine, a triol such as trimethylol propane, or a tetrafunctional glycol, such as N,N,N',N'-tetra-bis-(2-hydroxypropyl)ethylenediamine.

Since 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent and/or a difunctional glycol. The first commercially successful polyurethane covered golf ball was the Titleist® Professional ball, first released in 1993.

Unlike SURLYN® covered golf balls, polyurethane golf ball covers can be formulated to possess the soft "feel" of balata covered golf balls. However, golf ball covers made from polyurethane have not, to date, fully matched SURLYN® golf balls with respect to resilience or the rebound of the golf ball cover, which is a function of the initial velocity of a golf ball after impact with a golf club.

U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a thermosetting polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

International Patent Application WO 98/37929 discloses a composition for golf ball covers that comprises a blend of a diisocyanate/polyol prepolymer and a curing agent comprising a blend of a slow-reacting diamine and a fast-reacting diamine. Improved "feel", playability, and durability characteristics are exhibited.

Conventional polyurethane elastomers are known to have lower resiliency than SURLYN® and other ionomer resins. It has now been discovered that the use of a polyurethane composition, according to the present invention, in forming golf ball cores, intermediate and mantle layers, and/or covers, can raise the velocity of a golf ball prepared with the composition closer to the velocities observed with SURLYN®-covered golf balls. Additionally, the curatives used in the compositions of the present invention are less expensive than many curatives typically used by those of ordinary skill in the art, such as VERSALINK® P-250, an oligomeric diamine manufactured by Air Products and Chemicals, Inc. Moreover, the compositions of the present invention are less environmentally hazardous than other cost-effective options, such as ETHACURE® 300 and ETHACURE® 100.

SUMMARY OF THE INVENTION

The present invention is directed to a golf ball comprising a center, a cover, and optionally, at least one intermediate layer disposed between the center and the cover. At least one of the center, the cover, and the at least one intermediate layer is formed with a polyurethane composition comprising a reaction product of a prepolymer of at least one polyol and at least one polyisocyanate, and a curing agent of at least one diol. It has been discovered that the polyurethane composition, according to the present invention, when used to form a golf ball, can increase the initial velocity of the golf ball compared to an identical golf ball prepared with conventional technology.

In one embodiment, the diol curing agent has the formula:

$$HOH_2CH_2C(OH_2CH_2C)_nO\text{-}X\text{-}O(CH_2CH_2O)_mCH_2CH_2OH$$

wherein n and m, each separately have a value of 0, 1, 2, or 3, and wherein X is ortho-phenylene, meta-phenylene, para-phenylene, ortho-cyclohexyl, meta-cyclohexyl, or para-cyclohexyl. Preferably, n and m, each separately have a value of 1 or 2.

In another embodiment, the diol curing agent is selected from the group consisting of 1,3-bis(2-hydroxyethoxy) benzene, 1,3-[bis-(2-hydroxyethoxy)]-diethoxy benzene, 1,4-butanediol, resorcinol-di-(β-hydroxyethyl)ether, hydroquinone-di-(β-hydroxyethyl)ether, ethylene glycol, diethylene glycol, polyethylene glycol, lower molecular weight polytetramethylene ether glycol having average molecular weights between about 250 to 1000, and mixtures thereof. In another embodiment, the polyurethane comprises at least two diol curing agents. In still another embodiment, the molecular weight of the diol is at least about 50.

In another embodiment, the polyisocyanate is selected from the group consisting of 4,4'-diphenylmethane diisocyanate, polymeric 4,4'-diphenylmethane diisocyanate, toluene diisocyanate, 3,3'-dimethyl-4,4'-biphenylene diisocyanate, para-phenylene diisocyanate, 4,4'-dicyclohexylmethane diisocyanate, isophoronediisocyanate, and mixtures thereof In a further embodiment, the polyol is selected from the group consisting of polytetramethylene ether glycol, poly (oxypropylene)glycol, polybutadiene glycol, polyethylene adipate glycol, polyethylene propylene adipate glycol, and polybutylene adipate glycol, ortho-phthalate-1,6-hexanediol polyester polyol, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof. Preferably, the polyol is selected from polytetramethylene ether glycol, polyethylene adipate glycol, polybutylene adipate glycol, diethylene glycol initiated caprolactone, and mixtures thereof. In another embodiment, the molecular weight of the polyol is from about 200 to 4000.

In still another embodiment, the polyol is present in an amount of about 70 to 98 percent by weight of the prepolymer, the polyisocyanate is present in an amount of about 2 to 30 percent by weight of the prepolymer, and the diol curing agent is present in an amount of about 10 to 110 weight percent of the prepolymer. Preferably, the polyisocyanate is present in an amount of about 6 to 12 percent by weight of the prepolymer.

In a preferred embodiment, the polyurethane composition comprises a reaction product of 4,4'-diphenylmethane diisocyanate, polytetramethylene ether glycol, and mixtures of 1,3-bis-(2-hydroxyethoxy)benzene and 1,3-[bis-(2-hydroxyethoxy)]-diethoxy benzene.

The cover of the golf ball may also be formed with the polyurethane composition of the present invention. The golf ball may also have at least one intermediate layer formed of the polyurethane composition. In one embodiment, the center is a fluid-filled center, a solid center, a gel center, or a hollow center.

In still another embodiment, the polyurethane composition further comprises a polyamine curing agent. Preferably, the polyamine curing agent is selected from the group consisting of isophrone diamine, dicyclohexylmethane diamine, isomers of 3,5-diethyltoluene-2,4(2,6)-diamines, isomers of 3,5-dimethylthio-2,4(2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

In still another embodiment, the polyurethane composition further comprises a density-modifying filler.

The present invention is also directed to a polyurethane composition, suitable for forming a variety of components in golf-related equipment, such as clubs, shoes, spikes, and the golf balls discussed above. The composition comprises a reaction product of a prepolymer of at least one polyol and at least one polyisocyanate, and a curing agent of at least one diol. In one embodiment, the polyurethane composition is used to form a golf ball component.

In one embodiment, the diol curing agent has the formula:

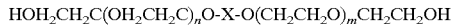

wherein n and m each separately have a value of 0, 1, 2, or 3, and wherein X is ortho-phenylene, meta-phenylene, para-phenylene, ortho-cyclohexyl, meta-cyclohexyl, or para-cyclohexyl. Preferably, n and m each separately have a value of 1 or 2.

In another embodiment, the diol curing agent is selected from the group consisting of 1,3-bis(2-hydroxyethoxy) benzene, 1,3-[bis-(2-hydroxyethoxy)]-diethoxy benzene, 1,4-butanediol, resorcinol-di-(β-hydroxyethyl)ether, hydroquinone-di-(β-hydroxyethyl)ether, ethylene glycol, diethylene glycol, polyethylene glycol, lower molecular weight polytetramethylene ether glycol having average molecular weights between about 250 to 1000, and mixtures thereof. In another embodiment, the polyurethane comprises at least two diol curing agents. In still another embodiment, the molecular weight of the diol is at least about 50.

In another embodiment, the polyisocyanate is selected from the group consisting of 4,4'-diphenylmethane diisocyanate, polymeric 4,4'-diphenylmethane diisocyanate, toluene diisocyanate, 3,3'-dimethyl-4,4'-biphenylene diisocyanate, para-phenylene diisocyanate, 4,4'-dicyclohexylmethane diisocyanate, isophoronediisocyanate, and mixtures thereof.

In a further embodiment, the polyol is selected from the group consisting of polytetramethylene ether glycol, poly (oxypropylene)glycol, polybutadiene glycol, polyethylene adipate glycol, polyethylene propylene adipate glycol, and polybutylene adipate glycol, ortho-phthalate-1,6-hexanediol polyester polyol, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof. Preferably, the polyol comprises polytetramethylene ether glycol, polyethylene adipate glycol, polybutylene adipate glycol, diethylene glycol initiated caprolactone, and mixtures thereof. In another embodiment, the molecular weight of the polyol is from about 200 to 4000.

In still another embodiment, the polyol is present in an amount of about 70 to 98 percent by weight of the prepolymer, the polyisocyanate is present in an amount of about 2 to 30 percent by weight of the prepolymer, and the diol curing agent is present in an amount of about 10 to 110 weight percent of the prepolymer. Preferably, the polyisocyanate is present in an amount of about 6 to 12 percent by weight of the prepolymer.

In a preferred embodiment, the polyurethane composition comprises a reaction product of 4,4'-diphenylmethane diisocyanate, polytetramethylene ether glycol, and mixtures of 1,3-bis-(2-hydroxyethoxy)benzene and 1,3-[bis-(2-hydroxyethoxy)]-diethoxy benzene.

The compositions of the invention may be used, for example, to form a golf ball cover, or a portion thereof. These compositions may also be used to form a golf ball inner cover layer, the cover, or a golf ball inner shell for a liquid, gel mass, or hollow center.

In still another embodiment, the polyurethane composition further comprises a polyamine curing agent. Preferably, the polyamine curing agent is selected from the group consisting of isophrone diamine, dicyclohexylmethane diamine, isomers of 3,5-diethyltoluene-2,4(2,6)-diamines, isomers of 3,5-dimethylthio-2,4(2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

In still another embodiment, the polyurethane composition further comprises a density-modifying filler. Additionally, the polyurethane composition, according to the present invention, can be used to form an insert for a golf club. In another embodiment, the polyamine and the diol are mixed to form the curing agent.

DESCRIPTION OF THE PREFERRED EMBODIMENTS

This invention is particularly directed towards golf balls having an intermediate layer, and/or a cover formed of a polyurethane composition comprising the reaction product of a prepolymer comprising at least one polyisocyanate and at least one polyol, and a curing agent of at least one diol curative, preferably a blend of diol curatives, wherein the resultant golf ball possesses improved resiliency and initial velocity. The invention is also directed towards the use of the polyurethane composition in producing golf-related equipment, such as in an insert for a golf club as well as in the golf balls discussed herein.

Golf balls formed according to the invention may have a one-piece construction formed from a homogeneous mass consisting entirely of the polyurethane composition of the invention. Such balls may further include, if desired, blends of conventional golf ball cover and/or intermediate layer materials, such as those discussed herein. One-piece balls, formed with the materials disclosed herein, are quite durable, but do not provide great distance because of relatively high spin and low velocity. A more preferred aspect of the present invention includes two-piece, multi-component, and wound balls having cores, liquid centers, intermediate layers, and/or covers comprising polyurethane blend of the type disclosed herein.

As used herein, the term "golf ball core" can be used to refer to any portion of a golf ball contained within the cover. In the case of a golf ball having three or more layers, the term "golf ball core" includes at least one inner layer and typically refers to a center and at least one intermediate layer. Such balls are known as "dual core" golf balls. The center may be solid, gel, hollow, or fluid filled. The term "inner core" may be used interchangeably with "center" or "golf ball center", while the term "outer core" may be used interchangeably with "intermediate layer" or "at least one intermediate layer." For example, one optional type of intermediate layer is a tensioned elastomeric material wound about the center. When a tensioned elastomeric material is included as an intermediate layer, the compositions of the invention are preferably incorporated into the elastomeric material, the center, or both. An intermediate layer may be included within a ball having, for example, a single layer or multilayer cover, a single layer or multilayer core, both a single layer cover and core, or both a multilayer cover and a multilayer core. Intermediate layers of the type described above are sometimes referred to in the art, and, thus, herein as well, as an inner cover layer, as an outer core layer, or as a mantle layer.

The polyurethane composition of the present invention is preferably comprised of at least one polyisocyanate, at least one polyol, and at least one diol curative having the following general chemical structure:

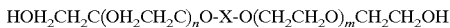

where n and m each separately have values of 0, 1, 2, or 3, and where X is ortho-phenylene, meta-phenylene, para-phenylene, ortho-cyclohexyl, meta-cyclohexyl, or para-cyclohexyl. Preferably, the values of n and m for the two branches of FIGS. 1–3, are 1 or 2. The various phenylene structures are depicted in FIGS. 1–3 below.

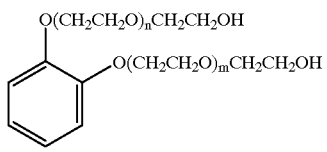

FIG. 1: o-phenylene

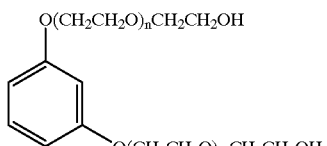

FIG. 2: m-phenylene

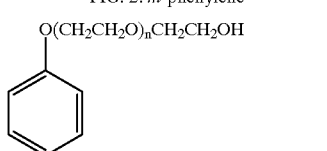

FIG. 3: p-phenylene

The polyurethane composition of the present invention contains at least one polyol. Suitable polyether polyols include, but are not limited to, polytetramethylene ether glycol, poly(oxypropylene)glycol, polybutadiene glycol, and mixtures thereof. Suitable polyester polyols include, but are not limited to, ortho-phthalate-1,6-hexanediol, polyethylene adipate glycol, polyethylene propylene adipate glycol, polybutylene adipate glycol, and mixtures thereof. Suitable polylactone polyols include, but are not limited to, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof. Preferred polyols for use with the invention include polytetramethylene ether glycol, polyethylene adipate glycol, polybutylene adipate glycol, and diethylene glycol initiated caprolactone. In another embodiment, the molecular weight of the polyol is from about 200 to 4000.

The polyurethane composition of the present invention contains a polyisocyanate. Suitable polyisocyanates for use in the present invention include 4,4'-diphenylmethane diisocyanate ("MDI"), polymeric MDI, toluene diisocyanate ("TDI"), 3,3'-dimethyl-4,4'-biphenylene diisocyanate ("TODI"), para-phenylene diisocyanate ("PPDI"), isophoronediisocyanate ("IPDI"), 4,4'-dicyclohexylmethane diisocyanate ("HMDI"), and mixtures thereof. Polyisocyanates are known to those skilled in the art as having more than one isocyanate group, i.e., di-, tri-, and tetra-isocyanate.

The polyurethane composition of the present invention comprises at least one diol curing agent. Suitable diol curatives for use in the present invention include at least one of 1,3-bis(2-hydroxyethoxy)benzene and 1,3-[bis-(2-hydroxyethoxy)]-diethoxy benzene, 1,4-butanediol, resorcinol-di-(β-hydroxyethyl)ether and hydroquinone-di-(β-hydroxyethyl)ether, ethylene glycol, diethylene glycol, polyethylene glycol, lower molecular weight polytetramethylene ether glycol having average molecular weights between about 250 to 1000, and including mixtures thereof. Preferably, the polyurethane composition comprises a blend or mixture of diol curing agents. In one embodiment, the polyurethane composition contains a single diol curing agent. It is well-known in the art that 1,3-[bis-(2-hydroxyethoxy)]-diethoxy benzene may also be referred to as 2,2'-[1,3-phenylenebis(oxy-2,1-ethanediyloxy)]bis-ethanol.

Addition of polyamine curatives to the above diol-cured composition has been found to improve cut, shear, and impact resistance of the resultant balls. The polyamine curatives of the present invention have the general formula:

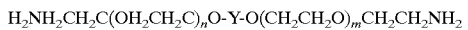

where n and m each separately have values of 0, 1, 2, or 3, and where Y is ortho-cyclohexyl, meta-cyclohexyl, para-cyclohexyl, ortho-phenylene, meta-phenylene, or para-phenylene.

Optionally, polyamine curatives may be added to the polyurethane composition of the invention. Preferred polyamine curatives include, but are not limited to, isophrone diamine, dicyclohexylmethane diamine, isomers of 3,5-diethyltoluene-2,4(2,6 )-diamines, isomers of 3,5-dimethylthio-2,4(2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof. Polyamine curing agents, such as 3,5-dimethylthio-2,4-toluenediamine and 3,5-dimethylthio-2,6-toluenediamine are isomers with two or more of the sites on the benzene ring substituted with groups that sterically hinder the reaction ability of the amine groups. Polyamine curing agents, such as trimethylene glycol-di-p-aminobenzoate and polytetramethyleneoxide-di-p-aminobenzoate, have the two amine groups situated adjacent to two electron withdrawing carbonyl groups, and are separated by flexible spacers, trimethylene, and polytetramethyleneoxide, respectively. Still another suitable group of polyamines comprises N,N'-dialkyldiamino diphenyl methane wherein the aromatic amine group is substituted by an alkyl group to become an aromatic secondary amine. The alkyl groups attached to the amine atoms, the flexible spacers between the amine groups, electron withdrawing groups, and bulky groups substituted adjacent to the amine atoms all contribute to attenuate the reactivity of the amine, offering an increase in reaction time.

An optional filler component may be chosen to impart additional density to blends of the previously described components. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additional fillers, such as foaming agents, glass spheres, and metal, can be added to the polyurethane compositions of the present invention, in amounts as needed, for their well-known purposes. Additional components which can be added to the polyurethane composition include UV stabilizers and other dyes, as well as optical brighteners and fluorescent pigments and dyes. Such additional ingredients may be added in any amounts that will achieve their desired purpose.

Core portions of golf balls formed according to the invention can be typically formed from a variety of elastomeric materials. A representative elastomer base composition for forming a portion of a golf ball core prepared in accordance with the present invention comprises a base rubber, a crosslinking agent and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The filler typically includes materials such as zinc oxide, barium sulfate, silica, calcium carbonate, metal, glass spheres and the like. The cores of golf balls formed according to the invention may be solid or hollow, fluid-filled or semi-solid filled, one-piece or multi-component cores, or they may, if desired, be wound.

In those embodiments wherein the cover or cover inner layer of the golf ball is formed with the polyurethane composition according to the invention, the cover is molded about the core in accordance with the teaching of U.S. Pat. Nos. 5,733,428 and 5,888,437, which are incorporated herein by express reference thereto.

The term "about," as used herein in connection with one or more numbers or numerical ranges, should be understood to refer to all such numbers, including all numbers in a range.

As used in the following example, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. However, when referring to the compression of a core, it is preferred to use a compressive load measurement.

EXAMPLE

The following example is provided for illustrative purposes only and is not to be construed as limiting the scope of the invention in any manner.

Example 1

Comparison of a Conventional Golf Ball with a Golf Ball Produced According to the Invention Two identically-constructed golf balls were prepared, each comprising a liquid-filled center, a wound layer, and a cover. The first golf ball (control formulation) had a cover formed of a control formulation employing conventional polyurethane composition technology. In the second golf ball (experimental formulation), the cover layer was formed with the polyurethane composition of the present invention, comprising a reaction product of 4,4'-diphenylmethane diisocyanate, polytetramethylene ether glycol and mixtures of 1,3-bis-(2-hydroxyethoxy)benzene and 1,3-[bis-(2-hydroxyethoxy)]-diethoxy benzene. A color dispersion was added to both formulations. The golf ball products were processed according to methods described in the U.S. Pat. Nos. 5,733,428 and 5,888,437. The formulations of both golf balls are set forth in Table 1 below.

TABLE 1

| | Formulations | |
|---|---|---|
| Materials | Control Formulation | Experimental Formulation |
| MDI - PTMEG Prepolymer[1] | 1 eq. | 1 eq. |
| HER - TG 250[2] | — | 0.95 eq. |
| VERSALINK ® P-250[3] | 0.95 eq. | — |
| Color Dispersion | 3.5% | 3.5% |

[1]MDI present in an about 9% and PTMEG present in about 91%.
[2]Mixture of 1,3-bis-(2-hydroxyethoxy) benzene and 1,3-[bis-(2-hydroxyethoxy)]-diethoxy benzene, manufactured by Indspec Chemical Corporation.
[3]An oligomeric diamine manufactured by Air Products and Chemicals, Inc.

As can be clearly seen in Table 2 below, the golf ball prepared according to the present invention (Experimental Formulation) had a 3.5 ft/s gain in initial velocity compared to the control golf ball. An increase of 3.5 ft/s in the golf ball initial velocity, as is well-known to those of ordinary skill in the art, is a significant increase. In efforts to achieve initial velocity values as close as possible to the maximum limit of 255 ft/s, set by the USGA, the increase demonstrated above is extremely beneficial. Additionally, the golf ball prepared according to the present invention exhibited a significantly lower compression (i.e., better "feel") yet retained the same hardness as the golf ball made with a control formulation. As is also recognized by those of ordinary skill in the art, a lower golf ball compression will result in lower driver spin, allowing the golf ball to more closely match ideal launch conditions for maximum distance.

TABLE 2

| | Golf Ball Properties | |
|---|---|---|
| Physical Properties | Control Formulation | Experimental Formulation |
| Size, in: nameplate | 1.682 | 1.688 |
| Size, in: equator | 1.681 | 1.684 |
| Weight, oz | 1.600 | 1.599 |
| Compression, Atti | 93 | 86 |
| Cover Hardness, Shore D | 58 | 58 |
| Ball Initial Velocity, ft/s | 249.4 | 252.9 |

The polyurethane composition according to the present invention can be used for other golf equipment such as inserts for golf clubs. For example, such inserts can be in the face of a golf club, like that disclosed in U.S. Pat. No. 5,316,298 which is incorporated in its entirety by reference herein, or in the back cavity like that disclosed in U.S. Pat. No. 5,575,472 which is also incorporated in its entirety by reference herein.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a center, a cover, and optionally, at least one intermediate layer disposed between the center and the cover, wherein at least one of the center, the cover, and the at least one intermediate layer is formed with a polyurethane composition comprising a reaction product of a prepolymer of at least one polyol and at least one polyisocyanate, and a curing agent of at least one diol, wherein the diol curing agent has a formula:

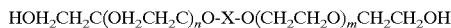

HOH$_2$CH$_2$C(OH$_2$CH$_2$C)$_n$O-X-O(CH$_2$CH$_2$O)$_m$CH$_2$CH$_2$OH wherein n and m, each separately have a value of 0, 1, 2, or 3, and wherein X is ortho-phenylene, meta-phenylene, para-phenylene, ortho-cyclohexyl, meta-cyclohexyl, or para-cyclohexyl.

2. The golf ball of claim 1, wherein n and m each separately have a value of 1 or 2.

3. The golf ball of claim 1, wherein the at least one diol curing agent is selected from the group consisting of 1,3-bis(2-hydroxyethoxy)benzene, 1,3-[bis-(2-hydroxyethoxy)]-diethoxy benzene, resorcinol-di-(β-hydroxyethyl)ether, hydroquinone-di-(β-hydroxyethyl) ether, and mixtures thereof.

4. The golf ball of claim 3, wherein the molecular weight of the diol curing agent is at least about 50.

5. The golf ball of claim 1, wherein the polyurethane composition comprises at least two diol curing agents.

6. The golf ball of claim 1, wherein the polyisocyanate is selected from the group consisting of 4,4'-diphenylmethane diisocyanate, polymeric 4,4'-diphenylmethane diisocyanate, toluene diisocyanate, 3,3'-dimethyl-4,4'-biphenylene diisocyanate, para-phenylene diisocyanate, 4,4'-dicyclohexylmethane diisocyanate, isophorone diisocyanate, and mixtures thereof.

7. The golf ball of claim 1, wherein the polyol is selected from the group consisting of polytetramethylene ether glycol, poly(oxypropylene)glycol, polybutadiene glycol, polyethylene adipate glycol, polyethylene propylene adipate glycol, and polybutylene adipate glycol, ortho-phthalate-1, 6-hexanediol polyester polyol, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof.

8. The golf ball of claim 7, wherein the molecular weight of the polyol is from about 200 to 4000.

9. The golf ball of claim 1, wherein the polyol is selected from the group consisting of polytetramethylene ether glycol, polyethylene adipate glycol, polybutylene adipate glycol, diethylene glycol initiated caprolactone, and mixtures thereof.

10. The golf ball of claim 1, wherein the polyol is present in an amount of about 70 to 98 percent by weight of the prepolymer, the polyisocyanate is present in an amount of about 2 to 30 percent by weight of the prepolymer, and the diol curing agent is present in an amount of about 10 to 110 weight percent of the prepolymer.

11. The golf ball of claim 10, wherein the polyisocyanate is present in an amount of about 6 to 12 percent by weight of the prepolymer.

12. The golf ball of claim 1, wherein the polyurethane composition further comprises at least one polyamine curing agent.

13. The golf ball of claim 12, wherein the polyamine curing agent is selected from the group consisting of isophrone diamine, dicyclohexylmethane diamine, isomers of 3,5-diethyltoluene-2,4(2,6)-diamines, isomers of 3,5-dimethylthio-2,4(2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

14. The golf ball of claim 12, wherein the polyamine curing agent has a formula:

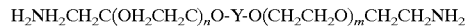

H$_2$NH$_2$CH$_2$C(OH$_2$CH$_2$C)$_n$O-Y-O(CH$_2$CH$_2$O)$_m$CH$_2$CH$_2$NH$_2$ wherein n and m, each separately have a value of 0, 1, 2, or 3, and wherein X is ortho-phenylene, meta-phenylene, para-phenylene, ortho-cyclohexyl, meta-cyclohexyl, or para-cyclohexyl.

15. The golf ball of claim 1, wherein the polyurethane composition comprises a reaction product of 4,4'-diphenylmethane diisocyanate, polytetramethylene ether glycol, and mixtures of 1,3-bis-(2-hydroxyethoxy)benzene and 1,3-[bis-(2-hydroxyethoxy)]-diethoxy benzene.

16. The golf ball of claim 1, wherein the cover is comprised of the polyurethane composition.

17. The golf ball of claim 1, wherein the ball comprises at least one said intermediate layer and wherein at least one said layer is comprised of the polyurethane composition.

18. The golf ball of claim 1, wherein the center is a fluid-filled center, a solid center, a gel center, or a hollow center.

19. The golf ball of claim 1, wherein the polyurethane composition further comprises a density-modifying filler.

20. The golf ball of claim 1, wherein the at least one intermediate layer is disposed between the center and the cover, and the cover comprises the polyurethane reaction product.

* * * * *